(12) United States Patent
Dastidar et al.

(10) Patent No.: US 12,388,802 B2
(45) Date of Patent: Aug. 12, 2025

(54) SECURE SHELL AND ROLE ISOLATION FOR MULTI-TENANT COMPUTE

(71) Applicant: XILINX, INC., San Jose, CA (US)

(72) Inventors: Jaideep Dastidar, San Jose, CA (US);
Jason Moore, Albuquerque, NM (US);
Brian S. Martin, Longmont, CO (US)

(73) Assignee: XILINX, INC., San Jose, CA (US)

( * ) Notice: Subject to any disclaimer, the term of this patent is extended or adjusted under 35 U.S.C. 154(b) by 266 days.

(21) Appl. No.: 17/716,881

(22) Filed: Apr. 8, 2022

(65) Prior Publication Data

US 2023/0328045 A1 Oct. 12, 2023

(51) Int. Cl.
*H04L 9/40* (2022.01)
*H04L 15/16* (2006.01)
*H04L 45/02* (2022.01)

(52) U.S. Cl.
CPC .......... *H04L 63/0435* (2013.01); *H04L 45/02* (2013.01); *H04L 63/0407* (2013.01); *H04L 63/145* (2013.01); *H04L 63/20* (2013.01)

(58) Field of Classification Search
CPC . H04L 63/0435; H04L 45/02; H04L 63/0407; H04L 63/145; H04L 63/20; G06F 21/57; G06F 21/76
USPC ......................................................... 713/171
See application file for complete search history.

(56) References Cited

U.S. PATENT DOCUMENTS

| | | | |
|---|---|---|---|
| 9,479,463 B2* | 10/2016 | Davis | H04L 49/3009 |
| 10,673,439 B1* | 6/2020 | Ahmad | H03K 19/17728 |
| 11,063,594 B1 | 7/2021 | Ahmad et al. | |
| 11,126,440 B1* | 9/2021 | Rajendran | G06F 9/4406 |
| 2003/0177387 A1* | 9/2003 | Osterwalder | H04L 63/105 726/12 |
| 2010/0029117 A1* | 2/2010 | Underwood | G02B 6/3897 439/304 |
| 2010/0100934 A1* | 4/2010 | Mejdrich | G06F 21/74 726/3 |
| 2010/0306304 A1* | 12/2010 | Cao | H04L 67/148 709/231 |

(Continued)

FOREIGN PATENT DOCUMENTS

| | | | | |
|---|---|---|---|---|
| EP | 3198500 B1 * | 5/2019 | | G06F 21/31 |
| FR | 3117641 A1 * | 6/2022 | | G06F 9/5072 |

OTHER PUBLICATIONS

SESAME: Software defined Inclaves to Secure Inference accelerators with multi-tenant execution. Sarbartha Banejee, Prakash Ramrakhyani, Shijia Wei and Mohit Tiwari. Universiy of Texas at Austin ARM Research. Jul. 15, 2020 . pp. 1-13 . (All together 14 pages).*

(Continued)

*Primary Examiner* — Emmanuel L Moise
*Assistant Examiner* — Berhanu Shitayewoldetadik
(74) *Attorney, Agent, or Firm* — Patterson + Sheridan, LLP (57) ABSTRACT

Embodiments herein describe a SoC with one or more untrusted islands that can host one or more roles or tenants in a data center environment (e.g., a cloud computing environment). In one embodiment, a secure shell encapsulates the untrusted islands with a secure application programming interface (API) to access other hardware resources in the SoC. Hardware resources in the SoC (e.g., HardIP, SoftIP, or both), can either be secure/trusted, or rely on the secure shell to ensure confidentiality.

20 Claims, 4 Drawing Sheets

(56) References Cited

U.S. PATENT DOCUMENTS

| | | | | |
|---|---|---|---|---|
| 2012/0266231 | A1* | 10/2012 | Spiers | G06F 9/45533 |
| | | | | 726/12 |
| 2014/0181573 | A1* | 6/2014 | Goss | H04L 45/021 |
| | | | | 710/305 |
| 2014/0334502 | A1* | 11/2014 | Gammon | H04L 69/08 |
| | | | | 370/466 |
| 2015/0074255 | A1* | 3/2015 | Davis | H04L 49/3009 |
| | | | | 709/223 |
| 2015/0180663 | A1* | 6/2015 | Kang | H04L 9/006 |
| | | | | 380/270 |
| 2016/0105530 | A1* | 4/2016 | Shribman | H04L 67/567 |
| | | | | 709/218 |
| 2017/0339166 | A1* | 11/2017 | Althouse | H04L 1/12 |
| 2019/0087354 | A1* | 3/2019 | Chhabra | G06F 21/64 |
| 2019/0297056 | A1* | 9/2019 | Chiang | H04L 63/1466 |
| 2021/0117242 | A1* | 4/2021 | Van De Groenendaal | |
| | | | | H04L 67/1001 |
| 2021/0120077 | A1 | 4/2021 | Guim Bernat et al. | |
| 2021/0159902 | A1* | 5/2021 | Lukefahr | H03K 19/1776 |
| 2021/0201638 | A1* | 7/2021 | Racz | H04L 63/101 |
| 2022/0103516 | A1* | 3/2022 | Pappachan | G06F 9/45558 |
| 2022/0353197 | A1* | 11/2022 | Singh | H04L 47/625 |
| 2022/0353339 | A1* | 11/2022 | Singh | H04L 45/04 |

OTHER PUBLICATIONS

Secure End-to-End Workflows using Containers in HPC. Simon Hernan Sarmiento Sabater. Institute of Computer Science. Oct. 7, 2021. pp. 1-27 (All together 34 pages).*

SESAME: Soft-ware defined; Enclaves to Secure Inference accelerators with Multi-tenant Execution. Sarbartha Baneljee. University of Texas at Austin. Jul. 15, 2020. (Year: 2020).*

International Search Report and Written Opinion from PCT/US2023/015309 dated Jun. 19, 2023.

Sarbartha Banerjee, et al., " SESAME: Software defined Enclaves to Secure Inference Accelerators with Multi-tenant Execution", ARXIV.org, Jul. 15, 2020.(14 pages).

Dessouky, Ghada, et al., "SoK: Secure FPGA Multi-Tenancy in the Cloud: Challenges and Opportunities", 2021 IEEE European Symposium on Security and Privacy, IEEE, Sep. 6, 2021 (20 pages).

Mbongue, Joel Mandebi, et al., "A Security Architecture for Domain Isolation in Multi-Tenant Cloud FPGAs", 2021 IEEE Computer Society Annual Symposium on VLSI, IEEE, Jul. 7, 2021 (6 pages).

* cited by examiner

SECURE SHELL AND ROLE ISOLATION FOR MULTI-TENANT COMPUTE

TECHNICAL FIELD

Examples of the present disclosure generally relate to encapsulating portions of a system on a chip (SoC) with a secure shell as part of the Trusted Compute Boundary (TCB).

BACKGROUND

Domain Specific Accelerators such as SmartNICs and other SoCs offload the work of multiple cloud tenants (e.g., cloud customers). These SoCs must offer high performance when offloading the tenants' workloads but also ensure that tenants cannot eavesdrop on each other's confidential information despite sharing the same hardware resource (e.g., the accelerator SoC). These domain specific accelerator SoCs are built with a disparate set of components such as I/O gateways (e.g., a Coherency and PCIe Module (CPM)); processing subsystems; Network, Storage, and Data Accelerators (e.g., data transform engines (DTEs) for the Host and Network Connections of the SoC, and programmable logic (PL). Multi-tenant data and metadata are transported across those components in the SoC using on-chip communication networks such as a network on a chip (NoC), or programmable logic fabric interconnect. Even within each cloud tenant, there can be a need for keeping confidential information of one department of a corporation with insider information, e.g. finance or legal, from accidental or malicious eavesdroppers in the rest of the corporation.

Further, with modern public cloud infrastructure becoming pervasive and reliable, the trend lately has been for government entities to award cloud contracts to public cloud infrastructure providers instead of building their own secure private cloud infrastructure. This adds a new requirement for security in the components to ensure that the government entity's keys used to encrypt and exchange information must not be accessible by the cloud infrastructure provider themselves, as well as ensuring the keys are not accessible to other cloud tenants.

SUMMARY

Techniques for establishing an untrusted tenant portion in a system on a chip (SoC) are described. The SoC can include an untrusted tenant portion comprising first circuitry, the untrusted tenant portion is configured to perform tasks for a plurality of tenants. The SoC further includes a secure shell comprising second circuitry, the secure shell is configured to serve as an interface to permit the tenant portion to communicate with other circuitry in the SoC. The SoC further includes a secure shell launcher configured to establish security protocols in the secure shell to protect confidential information for the plurality of tenants.

One example described herein is a method that includes designating an untrusted island in a SoC where the untrusted island comprises circuitry used to perform tasks for an entity other than an owner of the SoC, generating a secure shell around the untrusted island where the secure shell comprises circuitry configured to serve as an interface to permit the untrusted island to communicate with other circuitry in the SoC, and generating NoC routing tables to prevent an untrusted entry point to a NoC in the untrusted island from directly accessing a trusted entry point of the NoC in the secure shell.

One example described herein is a SoC that includes an untrusted island comprising first circuitry used to perform tasks for an entity other than an owner of the SoC, a secure shell comprising second circuitry that surrounds the untrusted island such that the untrusted island cannot transmit requests to other hardware elements in the SoC without first passing the requests through the secure shell, and a secure shell launcher configured to establish security protocols in the secure shell to protect confidential information for the entity.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the features or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Embodiments herein describe a SoC with one or more untrusted islands containing softIP (e.g., Programmable Logic or programmable implementation) or HardIP (e.g., fixed implementation IP such as an application specific integrated circuit (ASIC)) that can host one or more roles or tenants in a data center environment (e.g., a cloud computing environment). In one embodiment, a secure shell (or trusted shell) encapsulates the untrusted islands with a secure application programming interface (API) to access resources in the SoC such as data transform engines (DTE) (also referred to as data processing units (DPUs)), acceleration and cryptographic engines, and memory. Resources in the SoC (e.g., HardIP, SoftIP, or both), can either be secure/trusted, or rely on the secure shell to ensure confidentiality, with the combination of these resources forming the Trusted Compute Boundary (TCB). Advantages of the embodiments herein include preventing a rogue tenant from stealing the data center (DC) owner's (e.g. a Cloud Service Provider's (CSP's)) confidential information within the device (and vice versa), as well as preventing a rogue tenant from stealing another tenant's confidential information that were provisioned by the DC owner for that tenant.

Further, the secure shell and untrusted islands can be coupled to a shared SoC transport such as a NoC. In one embodiment, the NoC transport enables three different types of data paths: (i) between two untrusted entry/exit points in the untrusted island, (ii) between two trusted entry/exit points in the secure shell, and (iii) an untrusted entry point in the island to a specific, trusted entry point of a gatekeeper. After confirming the request from the untrusted island is not nefarious, the gatekeeper can then use a trusted entry point to permit the request to reach a different portion of the secure shell via the NoC.

Figure 1:
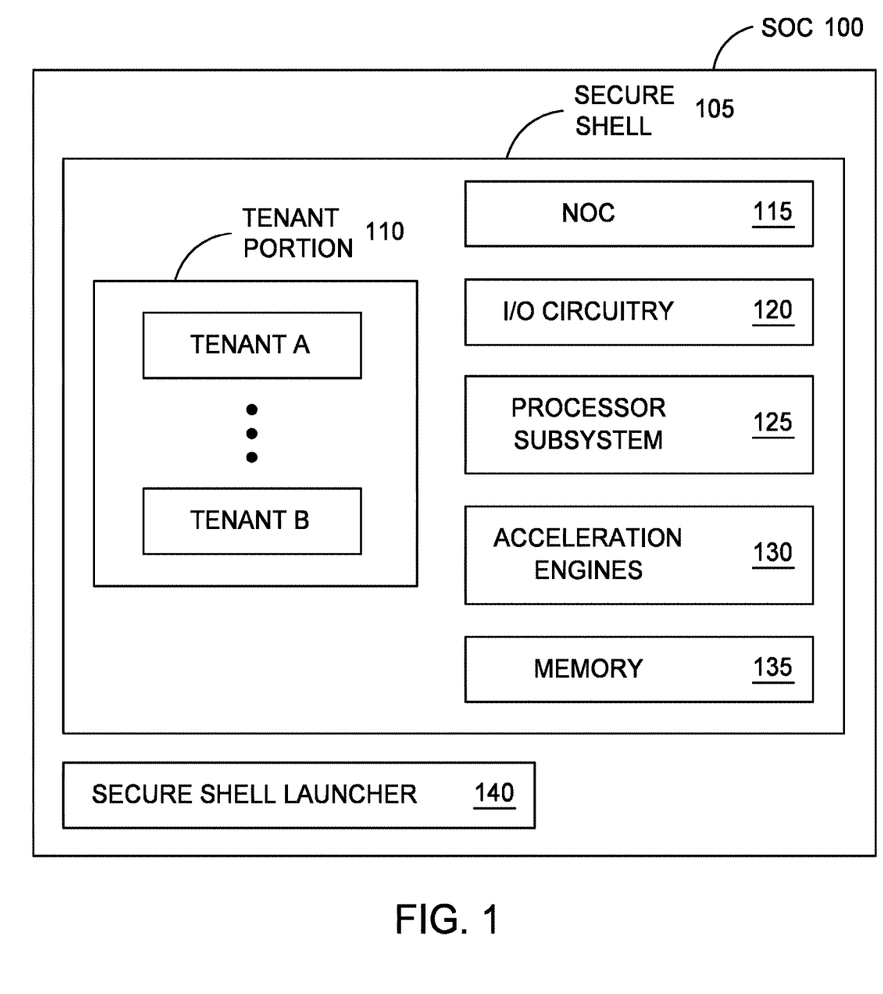
FIG. 1 illustrates a SoC with a secure shell and other TCB components, according to one embodiment.

FIG. 1 illustrates a SoC 100 with a secure shell 105, according to one embodiment. The SoC 100 can be an integrated circuit (IC). The SoC 100 can include programmable logic (PL), hardened circuitry, or a combination thereof. In one embodiment, the SoC 100 may be a field programmable gate array (FPGA), an ASIC, a SmartNIC, an acceleration device, a peripheral device, and the like.

As shown, the secure shell 105 surrounds a tenant portion 110 (also referred to herein as an untrusted island or an untrusted tenant portion) formed by the circuitry in the SoC 100. The tenant portion 110 includes hardware (e.g., circuitry) such as PL, hardened circuitry, or combinations thereof that can be used to perform tasks for tenants in a data center or a cloud computing environment. The tenant portion 110 is untrusted since it executes tasks for the tenants (or roles), which are not controlled by the owner of the SoC 100 (e.g., the DC owner or cloud service provider). As such, a malicious actor (e.g., a disgruntled employee of the tenant) may want to steal information from other tenants using the SoC 100 or steal confidential information from the SoC owner. As shown, multiple different tenants can use the circuitry in the tenant portion 110 of the SoC. For example, Tenant A may use some of the circuitry in the tenant portion 110 to perform its tasks while Tenant B uses some of the circuitry in the tenant portion 110 to perform its tasks.

The secure shell 105 (or trusted shell) encapsulates the untrusted islands (e.g., the tenant portion 110) with a secure application programming interface (API) to access other hardware resources in the SoC 100 such as a network on the chip (NoC) 115, I/O circuitry 120, a processor subsystem 125, acceleration engines 130 (e.g., machine learning or cryptographic engines), memory 135, and other types of circuitry such as DTEs or DPUs (not shown). As discussed in more detail below, the secure shell 105, prevents a rogue tenant from stealing the DC owner's (e.g. a Cloud Service Provider's) confidential information within the SoC 100 as well as preventing a rogue tenant (e.g., Tenant A) from stealing another tenant's confidential information (e.g., Tenant B) that were provisioned by the DC owner for that tenant. This confidential information can include keys used in data encryption.

In one embodiment, the secure shell 105 also prevents the DC owner from accessing the confidential information of the tenants, such as their keys used to encrypt and exchange information. To achieve this, the secure shell 105 may be established by the manufacturer of the SoC 100, rather than by the DC owner. That is, because the secure shell 105 is not configured or generated by the DC owner, but rather, the vendor of the SoC 100, the secure shell 105 can prevent the DC owner from accessing certain tenant confidential information, such as their cryptography keys. That is, the tenant may not trust the DC owner (or cloud provider), but the tenant does trust the manufacturer of the SoC 100.

In one embodiment, to establish trust between the tenants and the manufacture of the SoC 100, the manufacture can go through a certification program or process to ensure the SoC 100 establishes a secure shell 105 that prevents the DC owner from accessing the tenant's confidential information. For example, the manufacture may achieve a FIPS 140-3 Certification provided by the United States National Institute of Standards and Technology (NIST).

To establish the secure shell 105 (and other security mechanisms in the SoC 100), the SoC 100 includes a secure shell launcher 140 which may include circuitry in the SoC 100 that includes a cryptographically authenticated binary in the SoC 100 that is certified to establish security protocols in the secure shell 105 that prevent the DC owner from accessing the tenant's confidential information. The cryptographically authenticated binary may be stored as secure ROM or secure RAM in the SoC 100. When powering on or booting the SoC 100, the launcher 140 can establish the secure shell 105 to isolate the confidential information for the DC owner and the tenants from each other, as well as isolate the confidential information for the tenants from each other.

In one embodiment, the secure shell launcher 140 is executed by a controller or processor in the SoC 100 (e.g., the processor subsystem 125). This controller or processor may be a secure boot engine which has also been certified, and thus, is trusted by the tenants. In one embodiment, the controller or processor configures the SoC 100 so only it can access a configuration port to the secure shell 105, and thus, is the only circuitry in the SoC 100 that can configure or establish the secure shell 105. In addition to establishing the secure shell 105 and securing the data for the tenants (and their roles), the secure shell launcher 140 can serve a runtime function such as receiving tenant keys and unwrapping these keys to form clear text keys. The secure shell launcher 140 can also serve a runtime function such as generating public-private key-pairs, and exchanging the wrapped public key with a peer-tenant on another SoC. The secure shell launcher can then deposit these keys (clear text unwrapped or private keys) into the secure shell 105 via a firewalled path. Further, the secure shell launcher 140 can generate encrypted, authenticated updates to the secure shell 105.

Figure 2:
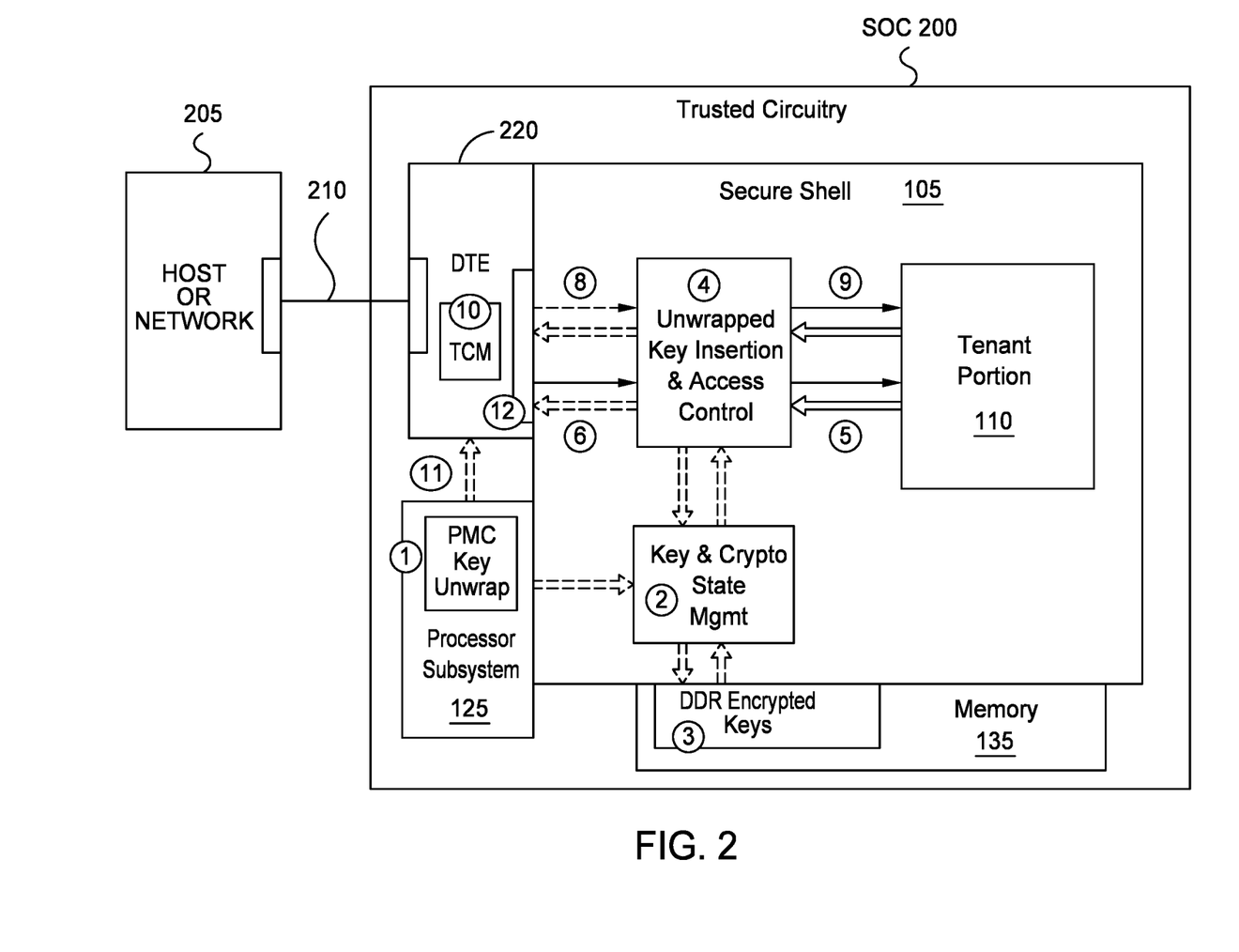
FIG. 2 illustrates a system with a SoC, according to one embodiment.

FIG. 2 illustrates a system comprising a SoC 200 coupled to a host or network 205. The SoC 200 can be an IC. The SoC 200 can include programmable logic (PL), hardened circuitry, or a combination thereof. In one embodiment, the SoC 200 may be a field programmable gate array (FPGA), an ASIC, a SmartNIC, an acceleration device, a peripheral device, and the like.

However, in another embodiment, the various circuitry in the SoC 200 may be divided into different ICs. For example, the secure shell 105 may be in an anchor die (or anchor IC) while the memory 135, DTE 220, and processor subsystem 125 may be disposed in different chiplets (e.g., chiplet ICs) connected on different sides or surfaces to the anchor die.

The host 205 may be a computing system such as a server. The host 205 is communicatively coupled to the SoC 200 via a connection 210 (e.g., a PCIe connection). If the SoC 200 is connected to a network 205, the network 205 may be a networking switch such as a Top of Rack (TOR) switch. The network 205 is communicatively coupled to the SoC 200 via a connection 210 (e.g., an Ethernet connection). The SoC 200 may be part of an accelerator device or SmartNIC disposed in the host 205. In other embodiments, the SoC 200 may be disposed external to the host 205.

As illustrated, the memory 135 stores encrypted keys. These keys are stored separate from the tenant portion 110 (i.e., the untrusted island) of the SoC 200. As such, the secure shell 105 can prevent the tenants from accessing the encrypted keys stored in the memory 135 for other tenants.

Label 1 in FIG. 2 discusses the processor subsystem (PS) 125 unwrapping encrypted tenant keys. In one embodiment, the PS 125 (or a sub portion of the PS 125) may be a secure boot engine which has been certified, and thus, is trusted by the tenants to unwrap (e.g., decrypt) their encryption keys. In one embodiment, the PS 125 can be a central processing unit with any number of processing cores which can execute software or binaries. Although not shown, the PS 125 can execute the secure shell launcher 140 in FIG. 1. In one embodiment, the key unwrap functionality and the sequence by which the keys are unwrapped are services provided by the PS 125 or a controller in the PS 125. The keys can be transmitted to the PS 125 from the host 205 in an encrypted state. The PS 125 can then unwrap (decrypt) the keys into clear text form.

The unwrapped keys and any associated metadata can be transmitted to Secure Shell Key Storage and Management (Label 2 in FIG. 2) via a NoC access controlled path such that only the PS 125 has access to the port at the Secure Shell Key and Crypto State Management location. As such, the PS 125 is the only hardware element in the SoC 200 that is external to the secure shell 105 that can access and change the unwrapped keys stored in the secure shell 105. Hardware in the secure shell 105 such as the Unwrapped Key Insertion and Access control and the DDR encrypted keys (which is also considered part of the secure shell 105) can also access the unwrapped keys.

The Secure Shell Key and Crypto State Management function can perform a multitude of functions including receiving unwrapped keys from the PS 125 and executing reads/write to an encrypted and access controlled aperture window in the memory 135 (Label 3 in FIG. 2), which can be DDR memory. Other defined functions can also be located here with the same access properties. In one embodiment, the encrypted aperture window can be accessed only by the secure shell 105 via a NoC access controlled path. These NoC access controlled paths will be described in FIG. 3. In one embodiment, the aperture for the memory 135 is set up to accept accesses only from the Secure Shell Key and Crypto State Management source to access the keys stored in the memory 135.

Label 4 illustrates unwrapped key insertion and access control where the unwrapped tenant keys can be inserted into requests or commands that are transmitted to the DTE 220. The access controls can issue commands with a context ID where DTE buffer read/write access is granted by the secure shell 105. Further, FIG. 2 illustrates that key insertion is performed in the secure shell 105 before data is then transmitted to the DTE 220 and eventually to the host 205. As discussed in FIG. 3, communication between the DTE 220 and the secure shell 105 can be provided by privileged entry points in the NoC. The circuitry in the NoC to provide these privileged entry points may be orders of magnitude smaller than using access control policy logic. The size of this logic would be determined by a size of an access control list (ACL), a policy of key storage, a policy for key rolling and reassignment of keys to the context ID, a filtering policy of information sent back to the role, etc.

Label 12 illustrates the interface in the DTE 220 for communicating with the secure shell 105. In one embodiment, all the interfaces for the DTE 220 have trusted access to the secure shell 105.

In one embodiment, the difference between a DTE API (Label 6) and the secure shell API (Label 5) can be minimized. For example, data communication between the tenant and the secure shell 105 can use a capsule definition with a Key ID used by the tenant (Label 5) while data communication between the secure shell 105 and the DTE 220 can use a trusted capsule (Label 6). The capsule definition can match the DTE physical interface to the host 205 such that the key is inserted by the secure shell 105. Moreover access control overhead is expected to be orders of magnitude larger than the overhead associated with insertion of a key into the capsule definition as shown in FIG. 2.

In one embodiment, the secure shell 105 controls the destination tenant port used by the secure shell 105 to communicate the data to the DTE 220 so that only the issuing tenant port gets the returning data (Labels 6 and 8). As shown by Label 9, the secure shell 105 can ensure that Tenant A's data channel is routed to only Tenant A assigned hardware in the tenant portion 110 and Tenant B's data channel is routed to only Tenant B assigned hardware in the tenant portion 110. In one embodiment, Labels 5 and 9 illustrate that each tenant (i.e., both Tenant A and Tenant B) have physically distinct ports to the secure shell 105 such that the secure shell 105 can enforce access control on both the issuing and response pathways.

In one embodiment, unwrapped keys that are part of the API of the DTE 220 to communicate with the secure shell 105 are issued only by the unwrapped key insertion function (Label 4) of the secure shell 105. Moreover, because the secure shell 105 performs access control at Label 4, no further access controls has to be performed within the DTE 220 at the interface shown by Label 12.

Label 10 illustrates a tightly coupled memory (TCM) in the DTE 220. As shown by the Label 11, the PS 125 and the secure shell 105 can write to the same index which is expected to be managed as mutually exclusive by a TCM management policy. That is, because the label sequence of Label 1 to Label 11 to Label 12 to Label 10 can be a "live" pathway to write to an index in the TCM and at the same time the label sequence of Label 1 to Label 2 to Label 4 to Label 6 to Label 12 to Label 10 can be another "live" pathway to write to potentially the same index in the TCM, one write can conflict with the other. Thus to prevent that sort of conflict, there is mutual exclusivity of indexes that can be written via the Label 11 to Label 12 pathway, and the Label 6 to Label 12 pathway.

Figure 3:
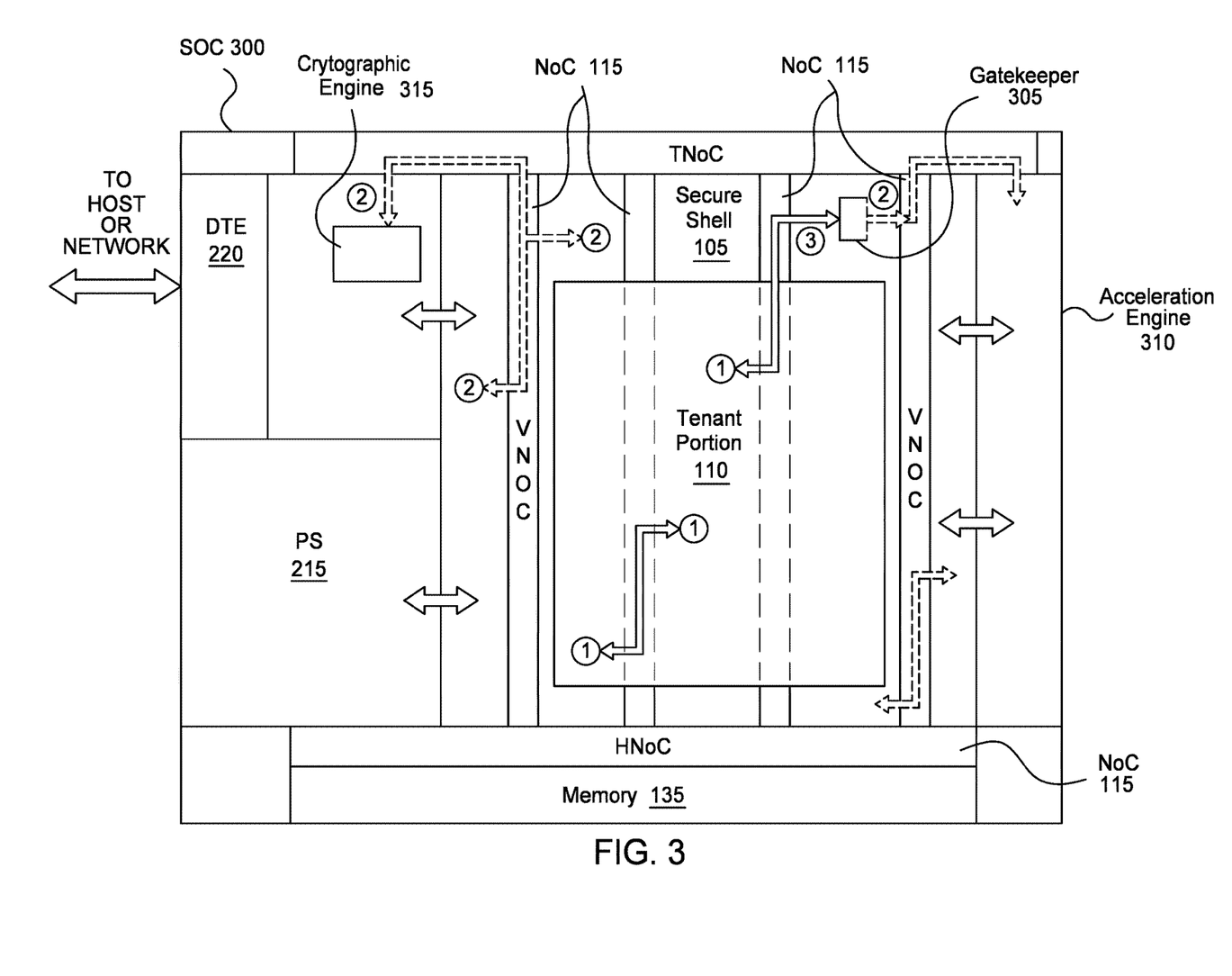
FIG. 3 illustrates data paths in a NoC, according to one embodiment.

FIG. 3 illustrates data paths in a NoC 115 in a SoC 300, according to one embodiment. The SoC 300 can be an IC. The SoC 300 can include programmable logic (PL), hardened circuitry, or a combination thereof. In one embodiment, the SoC 300 may be a field programmable gate array (FPGA), an ASIC, a SmartNIC, an acceleration device, a peripheral device, and the like.

However, in another embodiment, the various circuitry in the SoC 300 may be divided into different ICs. For example, the secure shell 105 may be in an anchor die (or anchor IC) while the memory 135, DTE 220, and PS 125 may be disposed in chiplets (e.g., chiplet ICs) connected on different sides or surfaces to the anchor die. The NoC 115 may also be divided into different chiplets and anchor die, with the NoC data paths also connected between the different ICs.

FIG. 3 illustrates three data paths through the NoC 115. Path 1 illustrates a path through the NoC 115 between two untrusted entry points in the tenant portion 110 (e.g., the untrusted island). This path permits a tenant to still use the NoC 115 to transmit data to another location in the tenant portion 110. For example, a tenant can use the NoC 115 to transmit data from first circuitry assigned to the tenant to second circuitry in the portion 110 also assigned to the tenant. Both ends of the Path 1 are untrusted entry points in the NoC 115. However, no untrusted entry point can use a trusted entry point of the NoC, except for one exception (Path 3). That is, a tenant cannot use an untrusted entry point of the NoC 115 that is within the tenant portion 110 to transmit or receive data to a portion of the NoC 115 that is outside the tenant portion 110 (e.g., to a trusted entry point to the secure shell 105, to the DTE 220, to the memory 135, to the PS 125, etc.).

Path 2 illustrates a path through the NoC 115 between two trusted entry points in the secure shell 105. As shown, none of Path 2 passes through the circuitry in the SoC 300 assigned to the tenant portion 110. These paths permits the circuitry in the secure shell 105 and the other hardware components in the SoC 100 (e.g., the DTE 220, the PS 125, the memory 135, etc.) to communicate with each other, such as the privileged entry points discussed in FIG. 2. Path 2 also permits the circuitry in the secure shell 105 to use the NoC 115 to transmit data to another location in the secure shell 105. For example, a function in the secure shell can use the NoC 115 to transmit data from first circuitry in the secure shell to a second circuitry in a different portion also in the secure shell 105. In this example, Path 2 is used to transmit data between circuitry in the NoC 115 to a cryptography engine 315 in the DTE. Again, the trusted entry points to the NoC 115 cannot be used to transmit data to, or receive data from, the untrusted entry points except for the exception shown in Path 3.

Path 3 illustrates a path through the NoC 115 between an untrusted entry point in the tenant portion 110 (i.e., the untrusted island) to a specified entry point of a gatekeeper 305. The gatekeeper 305 serves as an interface (e.g., an API) between an untrusted entry point and the rest of the trusted entry points in the NoC 115 (e.g., the trusted entry points to the secure shell 105 and to other trusted components in the SoC 300). For example, to reach the accelerator engine 310 (e.g., a network accelerator engine, a cryptography engine, a data compression engine, etc.), the data in the tenant portion 110 must pass through a gatekeeper. While FIG. 3 illustrates one gatekeeper 305, duplicates of this API circuitry may be disposed at different locations in the secure shell 105.

The gatekeeper 305 can filter the request from the untrusted entry point (e.g., the tenant) to make sure the request is not nefarious before then forwarding the data, using a trusted entry point to another location in the secure shell 105. To detect nefarious requests, in one embodiment the gatekeeper stores legitimate ContextIDs that the particular tenant is allowed to use (e.g., the same ContextID that is later used as a key index or a reference to the key used to encrypt/decrypt that tenant's data). Once the data has been filtered by the gatekeeper 305, it can then access any of the trusted entry points of the NoC 115. Further, to access the tenant portion 110 from a trusted entry point, the data must also pass through the gatekeeper 305. In one embodiment, an untrusted entry point for the NoC 115 in the tenant portion 110 is unable to directly communicate with the trusted entry points for the NoC 115 outside of the tenant portion 110 but is able to indirectly communicate with the trusted entry points via the gatekeeper 305.

To establish the rules for the three types of paths shown in FIG. 3, NoC routing tables can be programmed via the secure shell launcher (not shown) in the PS 125 and then locked out from access by the owner of the SoC 300 (e.g. the DC owner or the cloud service provider) and the tenants. Thus, attempts to directly access a trusted entry point from an untrusted entry point in the tenant portion 110 will fail because the NoC routing tables at the untrusted entry point are unable to resolve any traffic initiated by an untrusted agent because the physical identifier of the trusted entry points will not exist in the NoC routing table. Similarly, other hardware resources in the SoC 300 such as processor subsystem 215, acceleration engines 310, and DTEs 220 can have trusted and untrusted islands within them. Routing for the three types of paths may also exist within these resources or between these resources. To establish the rules for the three types of paths for these other hardware resources, configuration of routing tables, gatekeepers, or firewalls can also be programmed via the secure shell launcher (not shown) in the PS 125 and then locked out from access by the owner of the SoC 300, as can detection by the secure shell launcher of attempts by rogue actors to modify the routing tables or firewalls.

In one embodiment, a hash of the NoC configuration, including the routing tables, is maintained by the secure shell launcher such that attempts by rogue actors to modify the routing tables will be detected through a violation of a periodic hash result, and a secure lockdown event will prevent any confidential information (e.g., secrets/keys) from being accessed by the rogue actor.

Figure 4:
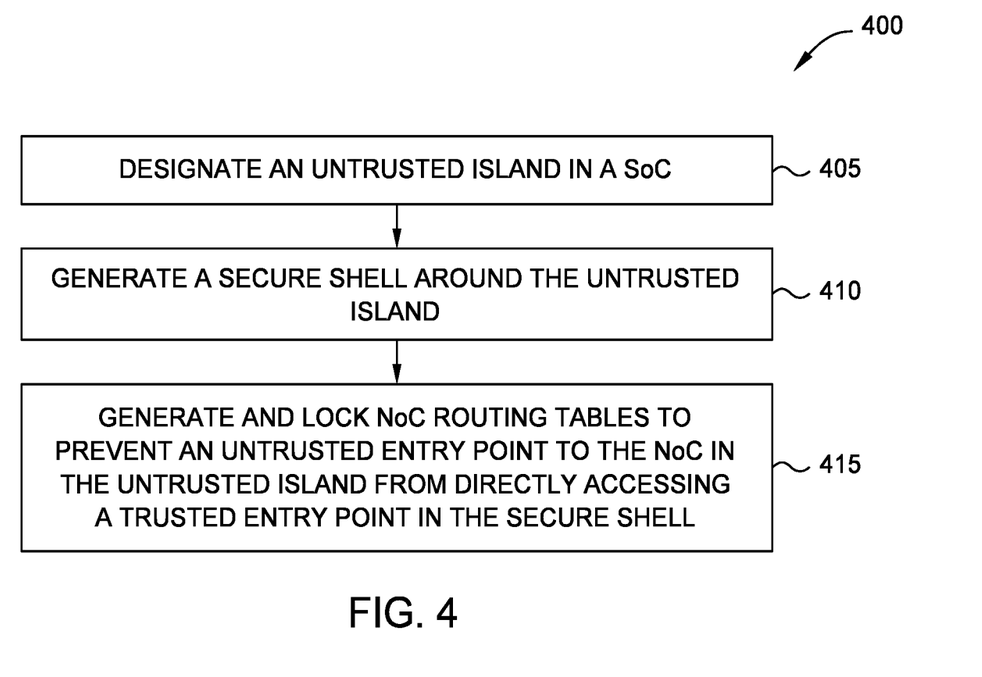
FIG. 4 is a flowchart for establishing a secure shell for an untrusted island in a SoC, according to one embodiment.

FIG. 4 is a flowchart of a method 400 for establishing a secure shell for an untrusted island in a SoC, according to one embodiment. At block 405, the secure shell launcher designates an untrusted island in a SoC. The untrusted island can include circuitry that is assigned to an entity other than the owner of the SoC. In a data center or a cloud computing environment, the untrusted island can include circuitry that is used by tenants or roles (e.g., subscribers to the data center or cloud computing environment). For example, a tenant may use the SoC to perform a task such as data compression, cryptography, machine learning/artificial intelligence, and the like. Multiple entities (e.g., multiple tenants) can be assigned circuitry in the untrusted island.

At block 410, the secure shell launcher generates a secure shell around the untrusted island. In one embodiment, the secure shell isolates the confidential information for the owner of the SoC and the tenants from each other, as well as isolates the confidential information for the tenants from each other. Further, the secure shell launcher may be outside of the control of the owner of the SoC. Instead, the secure shell launcher may include circuitry that executes a cryptographically authenticated binary or software program developed by the manufacture of the SoC. The secure shell launcher can be executed on circuitry in the SoC that, along with the cryptographically authenticated binary or software program, has been certified by a government agency or other certification authority in order to establish trust between the manufacture of the SoC and the tenants/owner of the SoC. As such, the tenants can trust the secure shell launcher to establish the secure shell in a manner that secures the tenant's confidential information from other tenants and the SoC owner, which is discussed in more detail in FIG. 2.

At block 415, the secure shell launcher generates and locks NoC routing tables to prevent an untrusted entry point to the NoC in the untrusted island from directly accessing a trusted entry point in the secure shell. For example, the NoC routing tables can establish the NoC path limitations described in FIG. 3 where an untrusted entry point in a portion of the NoC in the tenant portion (e.g., an untrusted island) can access another untrusted entry point in the NoC (Path 1). In one embodiment, the two untrusted entry points may have to be in portions of the untrusted island that are assigned to the same tenant to prevent one tenant from accessing a portion of the untrusted island assigned to another tenant. Further, two trusted entry points in the NoC, which are in trusted portions of the SoC (e.g., the secure shell, PS, DTE, memory, acceleration engines, etc.), can communicate with each other (Path 2). However, the NoC routing tables prevent an untrusted entry point from directly communicating with a trusted entry point using the NoC.

However, there is one exception where an untrusted entry point can (indirectly) communicate to a trusted entry point via a gatekeeper. The gatekeeper serves as an interface between an untrusted entry point and the rest of the trusted entry points in the NoC. For example, to reach circuitry in the trusted portions of the SoC (e.g., the secure shell, accelerator engine, PS, memory, etc.) the data originating in the untrusted island first passes through a gatekeeper. The secure shell can have multiple gatekeepers spread through the SoC.

The gatekeeper can filter the request from the untrusted entry point in the untrusted island to ensure the request is not malicious before then forwarding the data, using a trusted entry point, to another location in the trusted portion of the SoC using the NoC. Stated differently, once the data has been filtered by the gatekeeper, it can then be forwarded to any of the trusted entry points of the NoC. Further, in one embodiment, to access the untrusted island from a trusted entry point, the data first passes through the gatekeeper.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product.

Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the users computer, as a stand-alone software package, partly on the users computer and partly on a remote computer or entirely on the remote computer or server. In the latter scenario, the remote computer may be connected to the users computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. A system on a chip (SoC), comprising:
   an untrusted tenant portion comprising first circuitry, the untrusted tenant portion is configured to perform tasks for a plurality of tenants;
   a secure shell comprising a gatekeeper and second circuitry, the secure shell is configured to encapsulate the untrusted tenant portion to permit the untrusted tenant portion to communicate with other circuitry in the SoC; and
   a secure shell launcher that is physically separate from the secure shell and that is configured to establish security protocols in the secure shell to protect confidential information for the plurality of tenants and provide encrypted, authenticated updates to the secure shell, wherein the secure shell launcher is configured to enable communication between an untrusted entry point and a trusted entry point after data is passed through the gatekeeper.

2. The SoC of claim 1, further comprising a processor configured to execute the secure shell launcher, wherein the processor and a binary executed by the secure shell launcher are certified to establish security protocols in the secure shell that prevent an owner of the SoC from accessing the confidential information for the plurality of tenants.

3. The SoC of claim 2, wherein the processor is configured to unwrap encrypted tenant keys to form clear text keys used to encrypt data being transmitted from the untrusted tenant portion to a host coupled to the SoC, wherein the clear text keys are stored in the secure shell.

4. The SoC of claim 3, wherein the processor is configured to generate, wrap, and transmit encrypted tenant public keys used to encrypt data being transmitted to the untrusted tenant portion to a host coupled to the SoC.

5. The SoC of claim 3, wherein the processor is the only hardware element in the SoC external to the secure shell that can access and change the clear text keys stored in the secure shell.

6. The SoC of claim 1, further comprising a network on the chip (NoC) that extends through the untrusted tenant portion and the secure shell.

7. The SoC of claim 6, wherein the secure shell launcher is configured to generate NoC routing tables to prevent an untrusted entry point of the NoC in the untrusted tenant portion from directly communicating with a trusted entry point of the NoC outside of the untrusted tenant portion.

8. The SoC of claim 7, wherein the NoC routing tables permit the untrusted entry point of the NoC to communicate with the gatekeeper,
   wherein the gatekeeper is configured to:
      ensure data received from the untrusted entry point of the NoC is not malicious; and
      forward the received data to the trusted entry point of the NoC in the secure shell.

9. The SoC of claim 8, wherein the untrusted entry point of the NoC is configured to transmit data to multiple, different untrusted entry points in the NoC within the untrusted tenant portion.

10. A method, comprising:
    designating an untrusted island in a SoC, wherein the untrusted island comprises circuitry used to perform tasks for an entity other than an owner of the SoC;
    generating a secure shell encapsulating the untrusted island, wherein the secure shell comprises a gatekeeper and circuitry configured to serve as an interface to permit the untrusted island to communicate with other circuitry in the SoC; and
    generating NoC routing tables, by a secure shell launcher that is physically separate from the secure shell, to prevent an untrusted entry point to a NoC in the untrusted island from directly accessing a trusted entry point of the NoC in the secure shell and to provide encrypted, authenticated updates to the secure shell, wherein the secure shell launcher is configured to selectively enable communication between the untrusted entry point and the trusted entry point after data is passed through the gatekeeper.

11. The method of claim 10, wherein generating the secure shell and generating the NoC routing tables is performed by a processor in the SoC that is certified to establish security protocols in the secure shell that prevent the owner of the SoC from accessing confidential information for the entity.

12. The method of claim 11, further comprising:
    unwrapping, using the processor, an encrypted key for the entity to form a clear text key used to encrypt data being transmitted from the untrusted island to a host coupled to the SoC, wherein the clear text key is stored in the secure shell.

13. The method of claim 10, further comprising:
    receiving data transmitted by the untrusted entry point at the gatekeeper in the secure shell;
    ensuring, at the gatekeeper, that the data received from the untrusted entry point is not malicious; and
    forwarding, by the gatekeeper, the received data to the trusted entry point of the NoC in the secure shell.

14. The method of claim 10, wherein generating the NoC routing tables comprises:
permitting the untrusted entry point to transmit data to multiple, different untrusted entry points for the NoC within the untrusted island.

15. A SoC, comprising:
an untrusted island comprising first circuitry used to perform tasks for an entity other than an owner of the SoC;
a secure shell comprising a gatekeeper and second circuitry, wherein the secure shell surrounds the untrusted island such that the untrusted island cannot transmit requests to other hardware elements in the SoC without first passing the requests through the secure shell; and
a secure shell launcher that is physically separate from the secure shell and that is configured to establish security protocols in the secure shell to protect confidential information for the entity and provide encrypted, authenticated updates to the secure shell, wherein the secure shell launcher is configured to selectively enable communication between the untrusted entry point and the trusted entry point after data is passed through the gatekeeper.

16. The SoC of claim 15, further comprising a processor configured to execute the secure shell launcher, wherein the processor and a binary executed by the secure shell launcher are certified to establish security protocols in the secure shell that prevent the owner of the SoC from accessing the confidential information for the entity.

17. The SoC of claim 16, wherein the processor is configured to unwrap an encrypted entity key to form a clear text key used to encrypt data being transmitted from the untrusted island to a host coupled to the SoC, wherein the clear text key is stored in the secure shell.

18. The SoC of claim 17, wherein the processor is the only hardware element in the SoC external to the secure shell that can access and change the clear text key stored in the secure shell.

19. The SoC of claim 15, further comprising a NoC that extends through the untrusted island and the secure shell,
wherein the secure shell launcher is configured to generate NoC routing tables to prevent an untrusted entry point of the NoC in the untrusted island from directly communicating with a trusted entry point of the NoC outside of the untrusted island.

20. The SoC of claim 19, wherein the NoC routing tables permit the untrusted entry point of the NoC to communicate with the gatekeeper,
wherein the gatekeeper is configured to:
ensure data received from the untrusted entry point is not malicious; and
forward the received data to the trusted entry point of the NoC in the secure shell.

* * * * *